United States Patent
Melahn et al.

(10) Patent No.: US 9,703,801 B2
(45) Date of Patent: Jul. 11, 2017

(54) SYNCHRONIZATION OF CLIENT MACHINES WITH A CONTENT MANAGEMENT SYSTEM REPOSITORY

(71) Applicant: Alfresco Software, Inc.

(72) Inventors: Gregory Melahn, Raleigh-Durham, NC (US); Michael Gardner, Reading (GB); Ray Gauss, Baltimore, MD (US); Steven Glover, Bracknell (GB); Harpritt Kalsi, Slough (GB); Neil McErlean, Winchester (GB); Brian Remmington, Maidenhead (GB)

(73) Assignee: ALFRESCO SOFTWARE, INC., San Mateo, CA (US)

( * ) Notice: Subject to any disclaimer, the term of this patent is extended or adjusted under 35 U.S.C. 154(b) by 218 days.

(21) Appl. No.: 14/308,625

(22) Filed: Jun. 18, 2014

(65) Prior Publication Data
US 2015/0278323 A1    Oct. 1, 2015

Related U.S. Application Data

(60) Provisional application No. 61/970,280, filed on Mar. 25, 2014.

(51) Int. Cl.
*G06F 17/30* (2006.01)

(52) U.S. Cl.
CPC .. *G06F 17/30174* (2013.01); *G06F 17/30371* (2013.01); *G06F 17/30575* (2013.01)

(58) Field of Classification Search
CPC ......... G06F 17/30174; G06F 17/30575; G06F 17/30371
See application file for complete search history.

(56) References Cited

U.S. PATENT DOCUMENTS

| | | | |
|---|---|---|---|
| 8,812,627 B2* | 8/2014 | Donahue | G06F 9/5072 709/220 |
| 9,473,565 B2* | 10/2016 | Cameron | H04L 67/10 |
| 2005/0086384 A1* | 4/2005 | Ernst | G06F 17/30 709/248 |
| 2006/0136517 A1* | 6/2006 | Creamer | G06F 17/30575 |
| 2006/0248128 A1* | 11/2006 | Acharya | G06F 17/30368 |
| 2009/0222823 A1* | 9/2009 | Parkinson | G06F 9/466 718/101 |
| 2011/0295802 A1* | 12/2011 | Parham | G06F 17/30575 707/625 |

(Continued)

*Primary Examiner* — Richard Bowen
(74) *Attorney, Agent, or Firm* — Mintz Levin Cohn Ferris Glovsky and Popeo, P.C.

(57) ABSTRACT

A synchronization queuing service associated with a content management system repository can record file events occurring to content items maintained at the content management system repository. The synchronization queuing service can receive a file synchronization request for information identifying a content item to which a client machine is subscribed. The synchronization queuing service can determine consistency or inconsistency of a client machine state of the content item relative to the content item at the content management system repository and can respond to client machine with a file event summary comprising information usable by the client machine to identify actions necessary to synchronize the client machine state of the content item the content item.

21 Claims, 8 Drawing Sheets

(56) References Cited

U.S. PATENT DOCUMENTS

| | | | | |
|---|---|---|---|---|
| 2013/0124638 A1* | 5/2013 | Barreto | .................. | G06F 15/16 |
| | | | | 709/205 |
| 2014/0074788 A1* | 3/2014 | Chatterjee | ........... | H04L 41/5041 |
| | | | | 707/639 |
| 2014/0181053 A1* | 6/2014 | Belanger | ........... | G06F 17/30002 |
| | | | | 707/687 |
| 2014/0337491 A1* | 11/2014 | Barreto | ............. | G06F 17/30194 |
| | | | | 709/221 |
| 2015/0120662 A1* | 4/2015 | Dai | ................... | G06F 17/30575 |
| | | | | 707/634 |
| 2015/0186668 A1* | 7/2015 | Whaley | ............... | G06F 21/6218 |
| | | | | 713/156 |

\* cited by examiner

SYNCHRONIZATION OF CLIENT MACHINES WITH A CONTENT MANAGEMENT SYSTEM REPOSITORY

CROSS-REFERENCE TO RELATED APPLICATION

The current application claims priority under 35 U.S.C. §119(e) to U.S. Provisional Application Ser. No. 61/970,280 filed on Mar. 25, 2014, the disclosure of which is incorporated herein by reference.

TECHNICAL FIELD

The subject matter described herein relates generally to content management systems and, in some implementations, more specifically to synchronization of content items in a CMS repository with local copies of the content items stored on one or more client machines.

BACKGROUND

Enterprise content management (ECM) covers a broad range of applications, including document management (DM), Web content management (WCM), records management (RM), digital asset management (DAM), search of managed content, and the like. A content management system (CMS) suitable for managing the various content items (also referred to herein in some examples as files, documents, or the like) that an enterprise produces or generates, retains or otherwise stores, manipulates or modifies, etc. can support the requirements of one or more of such applications, and optionally other requirements, to provide a coherent solution in which content and management processes are capable of accessing content across a variety of applications subject to access controls, permissions, and the like. An "enterprise" can generally refer to an organization, such as for example a business or company, a foundation, a university, or the like, and can have content requirements related to one or more business processes, content uses, etc.

A CMS manages the actual digital content in a content item, the metadata that describes a context of each content item, associations between a content item and other content or content items, a place and classification of a content item in a repository, indexes for finding and accessing content items, etc. The CMS can also manage processes and lifecycles of content items to ensure that this information is correct. The CMS can further manage one or more processes (e.g. business processes, workflows, or the like) for creating, capturing, storing, manipulating, editing, and distributing content items, as well as all parts of a content item lifecycle (e.g., how long a content item is retained, what actions are taken after the end of a retention period, etc.).

A CMS for use in enterprise content management can include one or more of document management tools, applications, and interfaces to support general office work, search, and discovery. Workflow management capabilities of a CMS can support numerous business processes, optionally including, but not limited to, case management, review and approval, and the like. Collaboration applications and services of a CMS can support the collaborative development of information and knowledge in the creation and refinement of content and documents. Web content management services of a CMS, which can be scalable, can support the delivery and deployment of content from the enterprise to its customers. Records management capabilities of a CMS can capture and preserve records based upon government-approved or other standards. A standards-based platform can also provide access to applications that use these standards, such as publishing, image management, email management, etc.

Services and controls for managing content of a CMS can include features such as metadata management, version control, lifecycle management, workflow, search, associations to other content, tagging, commenting, etc. that allow users of the CMS to find desired content items among very large content collections that can span multiple parts of an enterprise. Accuracy and consistency of the information can also be ensured, even for very large content collections across an enterprise. Content and other information in a CMS can be presented, published, etc. through the Web or any other channel appropriate to allow users to access that information.

SUMMARY

As discussed in greater detail below, features of the current subject matter can improve the efficiency with which content changes are synchronized. Communications between client machines and a CMS repository can be streamlined and a burden on the CMS repository reduced through use of an intermediary service, such as for example a synchronization queuing service that receives messages about events affecting content items in the CMS (e.g. document creation, folder renaming, etc.) and maintains a database of metadata about the changes such as what content items have changed, the kind of change that has occurred, when the change occurred, and what client machines are interested in that change. Client machines can access the synchronization queuing service to determine whether content items in the CMS repository that the client machine is interested in (such as, for example, those that are stored as local copies on the client machine) have undergone a change since a previous access of the synchronization queuing service by the client machine and also to inform the synchronization queuing service of actions that the client machine has taken (such as, for example, creating a new file, making a change to a local copy of a content item, deleting a local copy of a content item, etc.). The client machine can then directly contact the CMS repository to act on the knowledge about what has changed (such as, for example, retrieving a newer version of a file or uploading a new file to the CMS repository).

Consistent with a non-limiting aspect of the current subject matter, a method includes recording a change set to a data structure maintained by a synchronization queuing service. The change set includes information about one or more file events affecting a content item maintained by a content management system repository with which the synchronization queuing service is associated. The method further includes the synchronization queuing service receiving a file synchronization request comprising an identifier of the content item and determining consistency or inconsistency of a client machine state of the content item at a client machine subscribed to the content item relative to a current state of the content management system repository. The determining includes comparing the change set with the identifier and a value representative of a most recent prior synchronization between the client machine and the synchronization queuing service. The method also includes responding with a file event summary that includes information usable by the client machine to identify actions necessary to synchronize the client machine state of the content item relative to the current state of the content management system repository.

In optional variations, one or more of the following features can be included in any feasible combination. The file synchronization request can further include a list that includes a change made at the client machine to affect the client machine state of the content item.

The method can further include subscribing the client machine to the content item. The subscribing can allow the client machine to request that the synchronization service compare the change made at the client machine to the current state of the content management system.

The information usable by the client machine to identify actions necessary to synchronize the client machine state of the content item relative to the current state of the content management system repository can include an indication of one or more of the following: that a change made at the client machine is in conflict with the current state of the content management system repository, that the change made at the client machine is not in conflict with the current state of the content management system repository such that the current state of the content management system repository can be safely updated to reflect the change made at the client machine, and that the change made at the client machine is no longer relevant to the current state of the content management system repository such the client machine can safely ignore the change made at the client machine.

The recording can further include the synchronization queuing service receiving a message and adding the file event to the data structure. The message can be received from the content management system repository, the client machine, and/or another client machine. The message can include a description of a file event of the one or more file events. The file event can include at least one of a change to the content item in the content management system repository, a change to a local copy of the content item that is stored on the client machine, and a change to a directory structure containing the content time at the content management system repository.

The data structure maintained by the synchronization queuing service can include a database of file events occurring for content items maintained at the content management system repository, and the recording can include at least one of creating, updating, and deleting an entry in the database.

The method can further include the synchronization queuing service receiving an update message from the content management system repository. The update message can provide the change set, which includes a file event of the one or more file events. The update message can be published by the content management system repository as part of a content management system transaction for an operation relating to the file event. Failure of the synchronization queuing service to receive the update message can cause the content management system repository to roll back the operation.

The method can further include the synchronization queuing service creating the file event summary using stored information associating the client machine identifier received in the file synchronization request with the content item to which the client machine is subscribed. The client machine can store a local copy of the content item to which it is subscribed.

The file synchronization request can be received from the client machine. The file synchronization request can include a request for synchronization information for any changes having occurred to the content item since the most recent prior synchronization between the client machine and the synchronization queuing service.

The content management system repository can be implemented on one or more machines separate from the at least one programmable processor implementing the synchronization queuing service.

The information usable by the client machine need not require the client machine to directly contact the content management system repository when no actions are necessary to synchronize the client machine state of the content item relative to the current state of the content management system repository.

The synchronization queuing service can include a multi-part service arrangement implemented on a plurality of machines, and the multi-part service arrangement can include a subscription service and a synchronization service. The subscription service can read the change set from the data structure and store the change set locally and can include a cache of metadata associated with a plurality of content items to which any of a plurality of managed client machines has subscribed. The synchronization service can manage a subset of the plurality of managed client machines, which includes the client machine discussed above. The synchronization service can receive the file synchronization request from the client machine, access the change set and cache of metadata stored locally by the subscription service, and respond to the client machine with the file event summary. The cache of metadata can include information about whether a state of the content item in the content management system repository has changed since the client machine last synchronized with the content management system repository.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a enterprise resource software system or other content management software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
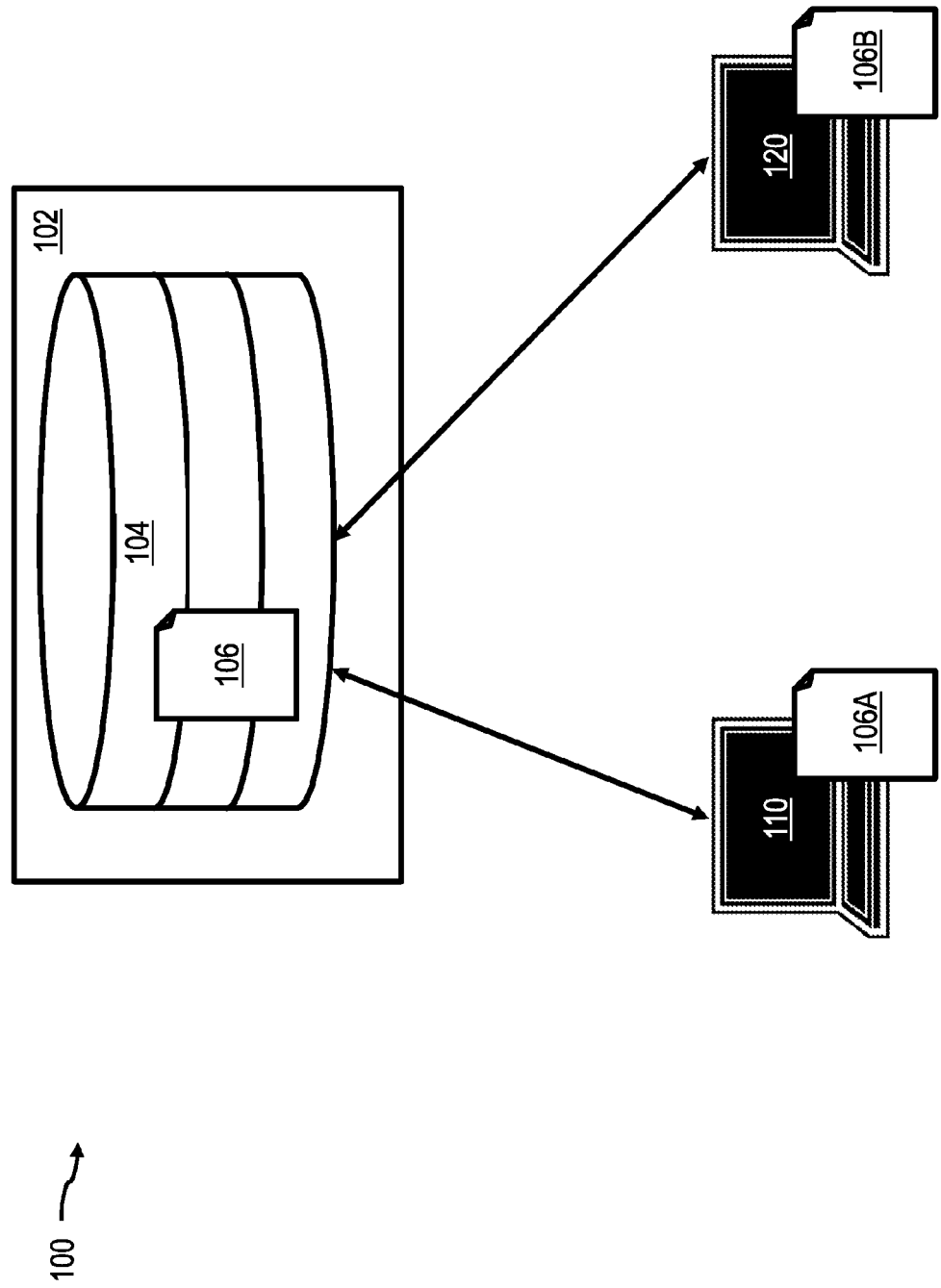
FIG. 1 shows a diagram illustrating features of a computing arrangement that includes a CMS installation and client machines storing copies of a content item maintained in a repository of the CMS installation.

Some CMS architectures support the use of local synchronization software. An example of this approach can include a local client synchronization application that executes on one or more client machines, such as for example workstations, desktop or laptop computers, mobile devices, other CMS installations, or other machines having at least intermittent access to the CMS repository over a network connection (e.g. a local area network, a wide area network, a cellular data connection, the Internet, or the like, or combinations thereof) and needing to synchronize content with the CMS repository. The CMS repository maintains a plurality of content items. A local client synchronization application running at a client machine can synchronize a local copy of one of these content items. The local copy can be stored on a local storage device (e.g. a hard drive, flash memory, random access memory, optical media, other magnetic media, or the like) associated with the client machine. A local storage device associated with the client machine can be integrated within the client machine, connected to the client machine as a peripheral device, accessible to the client machine over a networked connection, etc. The synchronizing can involve propagating of changes to the content item maintained by the CMS repository to the local copy such that the local copy remains consistent with the content item. In some examples, the local client synchronization application can be configured to allow a user of the client machine to synchronize changes made to the local copy back to the content item at the CMS repository. Synchronization in either direction (e.g. local copy to CMS repository or vice versa) can occur accordingly to one or more conflict resolution approaches, which can optionally be configurable by a CMS administrator, by the user, etc.

As used herein, content items can refer to any of files, folders or other directory structures, business processes, data objects, or any combination of one or more of such items or other similar or equivalent items. Examples of content items that can be managed by a CMS can include documents, images, photos, Web pages, records, XML documents, other unstructured or semi-structured files, etc. Content items retained in a CMS can also include directory structures such as folders, file trees, file plans, or the like, which can provide organization for multiple content items in addition to storing or otherwise representing relationships between content items, etc. Additionally, the approaches described herein for synchronizing file events occurring to content items stored at a CMS repository 104 with those occurring to local copies of the content item at one or more client machines can be used by local client synchronization applications designed to synchronize content and/or metadata as well as more specialized client applications, such as for example, a case management application running at a client machine that subscribes to all content items in a file set or other grouping of content items related to a specific case (or by one or more other criteria) that are stored in one or more CMS repositories and works to maintain local copies of those content items in proper synchronization with the content items in one or more CMS repositories.

In some examples, the local client synchronization application can communicate with the CMS repository to cause locking (e.g. allowing read-only access but not write access, allowing no access, etc.) of a content item at the CMS repository when a local copy of the content item is being edited or viewed via the local client synchronization application on the client machine. In other examples, locking of the content item at the CMS repository does not occur on opening or viewing of the local copy at the client machine. In these or other alternatives, locking of the local copy of a content item at the client machine can occur or not occur when the content item at the CMS repository is being edited, viewed, etc. Regardless of the access controls in place for the local copy or the content item itself, when changes to either of the content item or the local copy are saved, those changes are generally transmitted between the client machine and the CMS repository to maintain synchronization between the copy and the content item. This transmitting of saved changes generally occurs via the local client synchronization application initiating communication with the CMS repository to inquire whether changes have occurred to any content items at the CMS repository for which the client machine currently maintains a copy.

FIG. 1 shows a diagram illustrating features of a computing arrangement 100 in which an installation 102 of a content management system includes a CMS repository 104 on which a content item 106 is maintained. In this example, a first client machine 110 executing a local client synchronization application that is properly authenticated against the CMS installation 102 to have the necessary access to the CMS repository 104 can store a first local copy 106A of the content item 106, and this first local copy 106A can be synchronized with the content item 106 stored at the CMS repository 104. The first local copy 106A can be stored at the first client machine 110 on any type of data storage medium, such as for example a hard disk drive, a flash drive, in main memory, on an internal or external drive or storage device, etc. A second client machine 120 can optionally also store a second local copy 106B of the content item 106, and the second local copy 106A can also be synchronized with the content item 106 stored at the CMS repository 104. Synchronization of content items between a client machine and the CMS repository 104 as used herein can generally refer to processes by which changes are communicated over network connections between at least one client machine and the CMS repository 104.

In various examples of such a synchronization process, a local client synchronization application can be configured such that changes occurring to the content item 106 at the repository 104 are conveyed to the client machines 110, 120 for updating of the local copies 106A, 106B and changes occurring to the first local copy 106A or second local copy 106B at either of the first client machine 110 or second client machine 120 are conveyed to the repository 104 for updating of the content item 106. In some implementations of the current subject matter, changes are transmitted as they are saved, either as a result of saving an edit to the first local copy 106A at the first client machine 110, saving an edit to the second local copy 106B at the second client machine 120, or saving an edit to the content item 106 at the CMS repository (or by yet another client machine synchronizing changes to the content item 106 based on an edit to yet another local copy of the content item).

This conveying of changes can occur whenever a client machine 110, 120 is connected to a network allowing communication with the CMS repository 104. For example, a local client synchronization application operating on the first client machine 110 generally communicates with the CMS repository 104 or some other software component of the CMS installation 102 to inquire whether any changes have occurred to the content item 106 at the CMS repository 104 (e.g. so the such changes can be propagated to the first copy 106A) and to notify the CMS repository 104 of any changes that have occurred to the first copy 106A (e.g. so that such changes can be propagated to the content item 106). In cases in which the first client machine 110 is out of network communication with the CMS repository 104 for some period of time, when communication is restored, changes to either of the first local copy 106A or the content item 106 in the CMS repository 104 can be communicated between the first client machine 110 and the CMS repository 104. If both of the first local copy 106A and the content item 106 have changed, a conflict exception can be noted. Such a conflict exception can be resolved according to one or more conflict resolution parameters as discussed below. Changes synchronized from the first local copy 106A at the first client machine 110 to the content item 106 at the CMS repository 104 can be further synchronized to the second local copy 106B at the second client machine 120.

A local client synchronization application having similar functionality to that discussed above can be useful in facilitating availability of content items 106 stored in a CMS repository 104. For example, because the local client synchronization application synchronizes a locally stored copy 106A of a content item 106 with a corresponding representation of the same content item 106 in the CMS repository 104, a user of a client machine 110 executing the local client synchronization application can access the synchronized local copy 106A of the content item 106 even when the client machine 110 is not in networked communication with the CMS repository 104.

A growing challenge faced by modern content management systems is the ever-increasing number of client machines and other computing devices employed by users of a CMS installation 102. Conventional approaches to maintaining synchronization between the local copies 106A, 106B and the content item 106 generally involve configuring a local client synchronization application at a client machine 110 to initiate a request to the CMS repository 104 to send any updates or changes to a state of the content item 106 that have occurred since a last synchronization. Such requests are generally sent periodically while the client machine is online and running the local client synchronization application and also when the local client synchronization application is first initiated, when the client machine 110 is reconnected to a network connection or booted up, etc. For a change or update occurring to the local copy 106A at the client machine 110, the local client synchronization application is typically configured to send a notification of the changes from the client machine 110 to the CMS repository 104 when changes are saved or, alternatively, when a network connection is reestablished (e.g. if the client machine 110 is not able to communicate with the CMS repository 104 when the changes are saved) or when the local client synchronization application is re-launched on the client machine 110 after a period of being inactive.

The demands of large numbers of client machines directly communicating with a CMS repository 104 in this manner can result in resource allocation issues (e.g. of communications bandwidth, processing power, memory usage, etc.) negatively impacting the performance of the CMS repository 104. Additionally, excessive consumption of network bandwidth and other resources (e.g. processor cycles, battery life for mobile devices, etc.) can also occur for client machines communicating directly with the CMS repository 104. For example, using the above-described approaches, the client machine 110 can periodically send requests for updates from the CMS repository 104. These requests can be sent regardless of whether any actual change activity has occurred.

Implementations of the current subject matter provide approaches that can mitigate one or more of the aforementioned issues or that provide one or more other advantages pertaining to performance of a CMS repository 104 and/or one or more client machines 110, 120 that access content items maintained by the CMS repository 104. An intermediary (referred to herein as a synchronization queuing service) can receive file synchronization requests from client machines and can reply with file event summaries to each client machine indicating whether or not there is any reason why that client machine should contact the CMS repository directly.

A reason for the client machine to contact the CMS repository directly can include to request (e.g. using a content update request) details (e.g. in the form of a file event detail report) about changes to a state of the CMS repository that affect a local copy of one or more content items stored at the client machine or that otherwise affect a subscription status of the client machine to the one or more content items. The client machine can also need to contact the CMS repository directly in certain instances in which a change that affects a content item at the CMS repository or a state (e.g. a file hierarchy change, a subscription change, a file deletion, etc.) of the CMS repository needs to be propagated to the CMS repository from the client machine. In such cases, the synchronization queuing service (e.g. the intermediary) can provide sufficient information in a file event summary to inform the client machine whether a change to a local copy of a content item is consistent or inconsistent with any other changes to the content item that may have occurred (e.g. via another client machine accessing and changing the content item, etc.) since a most recent synchronization of the client machine with the CMS repository. Any conflicting changes or other mismatches in states between the client machine and the CMS repository can be handled consistent with one or more configuration parameters of the CMS repository and/or the local client synchronization application.

In the manner discussed above, the synchronization queuing service acting as an intermediary can enable a client machine to determine whether any changes have occurred to a content item to which it is subscribed since a most recent synchronization of the client machine's local copy of that content item and can to determine whether any locally implemented changes (e.g. to the local copy) should be synched with the CMS repository. These determinations can be made without any direct communication between the client machine and the CMS repository. Consistent with implementations of the current subject matter, the client machine only needs to contact the CMS repository if a) the content item at the CMS repository has changed since the last sync or b) if a local copy of the content item at the client machine has changed and not yet been synchronized and if the change to the local content item can properly be synchronized with the content item at the CMS repository. A change cannot be properly synched (or perhaps need not be synched at all) for reasons that can include, but are not limited to, occurrence of a conflicting change at the CMS repository since the most recent synchronization, a termination of permissions for the client machine to access a particular content item, a change in subscription status of the client machine to the content item, deletion of the content item at the CMS repository, etc.

Another advantageous feature of some implementations of the current subject matter is that the synchronization queuing service does not store or propagate detailed information about changes to content items or local copies of content items, but rather acts as in a intermediary capacity to inform multiple client machines whether they need to actually contact the CMS repository for synchronization. This approach can dramatically reduce the data traffic impacting the CMS repository as the synchronization queuing service receives and responds to inquiries from client machines regarding whether synchronization with the CMS repository is necessary. If the synchronization queuing service does not tell a client machine that any synchronization with the CMS repository is necessary, the client machine can present no data traffic load to the CMS repository.

Figure 2:
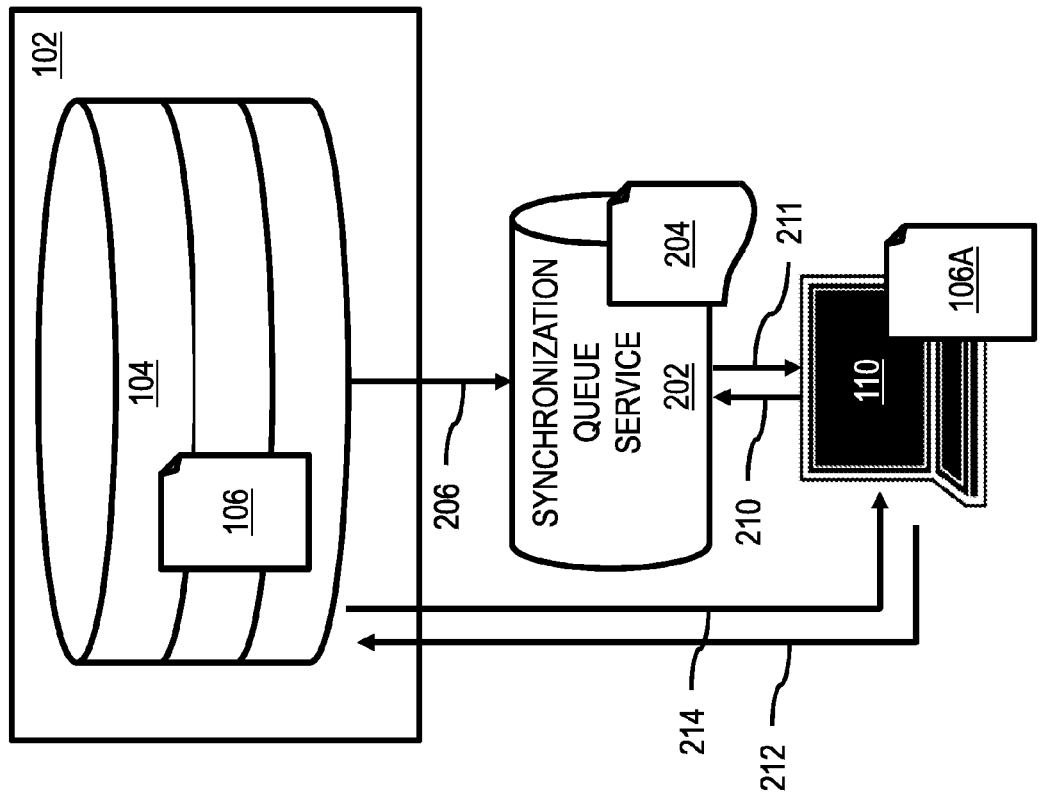
FIG. 2 shows a diagram illustrating a synchronization queuing service consistent with implementations of the current subject matter.

FIG. 2 shows a diagram 200 illustrating features consistent with implementations of the current subject matter. As shown, a client machine 110 need not communicate with the CMS repository 104 simply to find out whether a change has occurred to a content item 106 having a local copy 106A maintained at the client machine 110. Instead, content item changes can be synchronized between the CMS repository 104 and a client machine 110 through an approach that includes writing of messages describing a content item event (also referred to herein as a "file event") to a synchronization queuing service 202. A content item event or file event can be a change of any kind, and can occur as a result of some other client machine updating a content item 106, the client machine 110 itself causing a change to the local copy 106A that requires synchronizing with the content item 106, a background process running on the CMS repository 104 updating the content item 106, a web application that updates the content item 106, or in some other way.

A synchronization queuing service 202 as described herein can optionally be a self-contained service accessible by multiple client machines (including the client machine 110 shown in FIG. 2). For example, the synchronization queuing service 202 can include a queue 204 (e.g., a log, a database, database table, other data object, or the like) that records file events occurring to content items maintained in the CMS repository 104. A file event can include a change to the content or metadata of a content item, a change to a file directory structure within which the content item is stored (e.g. a renaming or moving of a folder or directory, etc.), a change in a subscription status of the client machine user relative to the content item, a deletion of a file or folder, etc. A change in permission status of a client machine user can occur as a result of the user changing roles, of the user being assigned to a different project or business process that does not require access to a previously available content item 106, of a project or business process relating to the content item 106 ending or being changed such that user access to the content item 106 is no longer required, or the like. A subscription status of a client machine user relative to a content item 106 can relate to whether the user has elected to retain a local copy 106A of the content item 106 at the client machine. When the user first subscribes to the content item 106, the local copy 106A can be created at the client machine 110. If the user unsubscribes from the content item 106, the local copy 106A can optionally be deleted or retained at the client machine 110. If the local copy 106A is retained, the unsubscribe event can cause no further updates to be exchanged between the client machine 110 and the CMS repository 104 relating to that content item 106.

The synchronization queuing service 202 can optionally be implemented on one or more machines separate from a machine or machines on which the CMS repository 104 is implemented. Alternatively, the synchronization queuing service 202 can be implemented as part of the CMS repository 104 or within the same computing environment as a CMS installation 102 that includes the CMS repository 104. The CMS installation 102 can be an on-premise installation, which can optionally be protected by a firewall, or a cloud-based installation, for example a multi-tenant architecture, in which the CMS installation runs on one or more servers and virtually partitions its data and configuration within one or more data storage systems accessible by the one or more servers. In a cloud-based CMS installation, each of multiple client organizations can optionally work with a customized virtual application instance supported by one of multiple tenants. Data specific to a given tenant of the multiple tenants are accessible only to authorized users of that tenant. Given this definition of a multi-tenancy arrangement, it will be readily understood that references herein to a cloud-based CMS installation are intended to refer broadly to data accessible to and isolated within a tenant of a multi-tenant implementation of a software as a service offering of a CMS. Such a tenant can optionally be further partitioned to include discrete sites (e.g. collaboration sites) to which various users can be granted desired access permissions (e.g. read, write, delete, create, etc.).

The queue 204 can be updated via update messages 206 sent from the CMS repository 104 to the synchronization queuing service 202 with each such update message 206 indicating one or more file events having occurred for one or more content items 106 at the CMS repository 104. An update message 206 from the CMS repository 104 to the synchronization queuing service 202 can be initiated for each file event affecting a content item 106 at the CMS repository 104. Alternatively, the CMS repository 104 can send an update message 206 to the synchronization queuing service 202 at some interval, after a threshold number of file events have occurred since a previous update message was sent, etc. Advantageously, publication of the update message 206 concerning the file event is part of the CMS transaction for the operation relating to the file event, to thereby assure that messages received by the synchronization queuing service 202 are complete. For example, if the CMS is processing a document update operation, and finds that it cannot inform the synchronization queuing service 202 about the event (e.g. because of a network failure) then the CMS will not complete the document update and instead will rollback that operation.

The client machine 110 can request information regarding file events having occurred to content items 106 at the CMS repository for which the client machine 110 stores a local copy 106A as well as those content items to which the client machine 110 is otherwise subscribed.

Being subscribed to a content item in this context can refer both to the approach discussed above, in which a client machine 110 retains a local copy 106A of a content item 106 as well as to other approaches in which local copies are not retained at the client machine for one or more or perhaps all content items that can be accessed by a user of the client machine 110. For example, a subscription by the client machine 110 can reference a file set, a file grouping of content items, one or more folders, or any other collection of one or more content items. Local copies of these content items can be stored at the client machine. Alternatively, local copies may be created at the client machine "on demand," for example by downloading one or more content items to the client machine (e.g. using a file check-out approach) when a user at the client machine requests access to the content item.

This second approach of downloading a content item on demand can be used in conjunction with local caching. For example, a client machine such as a tablet computer or smart phone might support subscribing to one or more content items maintained at the CMS repository. However, such devices can generally have relatively limited data storage capacity. Accordingly, some finite amount of data storage can allocated to caching of content items accessed from the CMS repository and downloaded to the client machine. In various examples, a fixed number of most recently downloaded content items are cached, a fixed amount of storage is allocated for caching of as many of the most recently downloaded content items as there is storage space for (with older content items being removed from the cache as necessary in either example), etc. A user can also be allowed to designate certain content items that are preferentially cached at the client machine 110. In such cases, a conventional approach to enabling client machine access to a content item 106 would involve contacting the CMS repository 104 to determine whether a cached version of the content item is current with the state of the CMS repository 104. Implementations of the current subject matter allow this process to occur without adding processing load to the CMS repository 104. The client machine 110 can determine based on the approaches described herein whether the CMS repository needs to be contacted to request a content item delta description, to simply download a more current version of the local copy 106A, to refresh the version of the content item in the local cache, or the like.

In one implementation, the client machine 110 sends a file synchronization request 210 to the synchronization queuing service 202, which responds to the client machine 110 with a file event summary 211 that is based on information in the queue 204. The file synchronization request 210 can optionally include information (e.g. metadata) identifying a content item 106 for which the client machine stores a local copy 106A. The file event summary 211 can include, for content items identified in the file synchronization request 210, information usable by the client machine to identify actions necessary to synchronize the client machine state of the content item relative to the current state of the content management system repository. In another implementation of the current subject matter, the file synchronization request 210 can include a client machine identifier, and the synchronization queuing service 202 can create the file event summary 211 using stored information associating the client machine identifier with the content items for which the client machine 110 stores local copies or is otherwise "subscribed to." Other approaches can use other types (or combinations of types) of information sent by the client machine 110 and received by the synchronization queuing service 202 in the file synchronization request 210 for determining the content item or content items at the CMS repository 104 that have experienced a file event since a most recent previous update of their local copies at a specific client machine 110. The actions necessary to synchronize the client machine state of the content item relative to the current state of the content management system repository can optionally include doing nothing or contacting the content management system repository either for details about changes to the content item or to forward changes that should be made to the content item based on changes having occurred to the content item at the client machine since the last synchronization.

The file synchronization request 210 can also optionally include a listing of changes that have occurred at the client machine 110 to affect the local copy 106A of the content item 106. In other words, the list can include a change affecting the client machine state of the content item 106. Consistent with some implementations of the current subject matter, this listing can identify all content items for which local copy changes have occurred at the client machine 110 as well as a time when such changes occurred. The listing need not include a full detail of the changes that have occurred. Rather, the listing can include at least content item identifiers indicating those content items for which the client machine has created a file event and a time stamp or other indicator of when the created file event or file events occurred.

Using the information in the file event summary 211 received from the synchronization queuing service, the client machine 110 can contact the CMS repository 104 to act upon the information it received from the synchronization queuing service 202 with respect to the content item 106. In an example in which the content item 106 has undergone a change since most recent prior synchronization, the client machine 110 can send a content update request 212 to the CMS repository. In response the CMS repository 104 returns a file event detail response 214 informing the client machine of the success (or failure) of the request for the content item 106 identified in the content update request 212. The file event detail report 214 can optionally include a complete updated version of the identified content item(s). Alternatively, the file event detail report 214 can include a delta file indicating changes to one or more of the content of the identified content items, metadata relating to the identified content items, or the like. The delta file can be applied to copies of the identified content items at the client machine 110 such that the copies are brought into synchronization with a current state of the identified content items at the CMS repository.

In an example in which the file synchronization request 210 sent from the client machine 110 to the synchronization queuing service 202 includes a listing of changes that have occurred at the client machine 110 that affect the content item 106, the file event summary 211 can include instructions to the client machine 110 for providing a detail of those changes to the CMS repository 104 to bring the client machine state of the content item (e.g. the local copy 106A) into synchronization with the content item 106 at the CSM repository 104. For example, information usable by the client machine to identify actions necessary to synchronize the client machine state of the content item relative to the current state of the content management system repository can include one or more of an indication that a change made at the client machine is in conflict with a current state of the content management system repository 104, an indication that the change made at the client machine is not in conflict with the current state of the content management system repository 104 such that the current state of the content management system repository 104 can be safely updated to reflect the change made at the client machine, and an indication that the change made at the client machine 110 is no longer relevant to the current state of the content management system repository 104 such the client machine 110 can safely ignore the change made at the client machine.

In some implementations of the current subject matter, the synchronization queuing service 202 can include a queue, a database, a log, or other record of file events occurring for content items at the CMS repository 104. Client machines can directly contact the synchronization queuing service 202 to receive information that the client machine 110 uses to determine whether to contact the CMS repository 104 with a content update request 212 (e.g. if content item 106 is out-of-date with respect to local copy 106A). Such an approach can provide advantages relative to a conventional approach in which all client machines directly contact the CMS repository to request information about whether the local copy 106A of the content item 106 are synchronized. Use of the synchronization queuing service 202 reduces the burden on the system or systems hosting the CMS repository 104 since most content (e.g. local copies 106A) on a client machine 110 does not change significantly on relatively brief time scales (e.g. from minute to minute), and most content in the CMS repository 104 likewise does not change.

In a further implementation of the current subject matter, the synchronization queuing service 202 can distribute (e.g. by sending of pushed messages) the information about content items states at the CMS repository 104 that the synchronization queuing service receives. For example, as shown in the diagram 300 of FIG. 3, the synchronization queuing service 202 can be consumed by one or more subscription services 302, which record file events in a database to allow one or more synchronization services 304 to consult with this database to determine a current status of a content item 106 and any actions required to synchronize local copies 106A of the content item with a current version of the content item 106 at the CMS repository 104.

In operation, the arrangement of FIG. 3 can operate as follows. The CMS repository 104 communicates file events or other changes affecting content items maintained or managed by the CMS repository 104 to the synchronization queuing service 202. The subscription service 302 reads the synchronization queuing service 202 and stores the changes. The subscription service 302 can also include a cache of metadata associated with any content items for which any client machine 110 currently stores a local copy or to which a user of the client machine 110 has subscribed (e.g. requested updates regarding the content item 106). To further distribute the workload and provide better performance and reliability, each of one or more synchronization services 304 can be responsible for managing a set of one or more client machines such that the synchronization service 304 is capable of answering a query or request from a managed client machine regarding any difference between states of the local copies stored on the client machine and the corresponding content items in the CMS repository 104. The synchronization service 304 need not itself store information about content changes, but can access such information that is stored by the subscription service (including a cache of metadata about the local content item copies stored by its managed client machines). A client machine 110 can include a cache of metadata about those local copies of content items that it stores locally and can also include a store of metadata about local stored files, including copies of one or more content items maintained in the content management system repository. While the client machine 110 can "get" and "put" content items or changes to content items directly from/to the CMS repository 104, a multi-part service arrangement similar to that depicted in FIG. 3 can improve the efficiency with which a client machine receives and/or transmits information about multiple file events affecting a repository state of the content items stored at the client machine 110 as local copies. This arrangement also allows the storage and processing of content event messages to be distributed in such a way as to improve security (for example by avoiding the distribution of content across company, national, or state boundaries where such is prohibited by statute, company policy, or the like), reduce latency by locating content event information closer to the clients that need it, and optimize bandwidth or CPU utilization.

Figure 3:
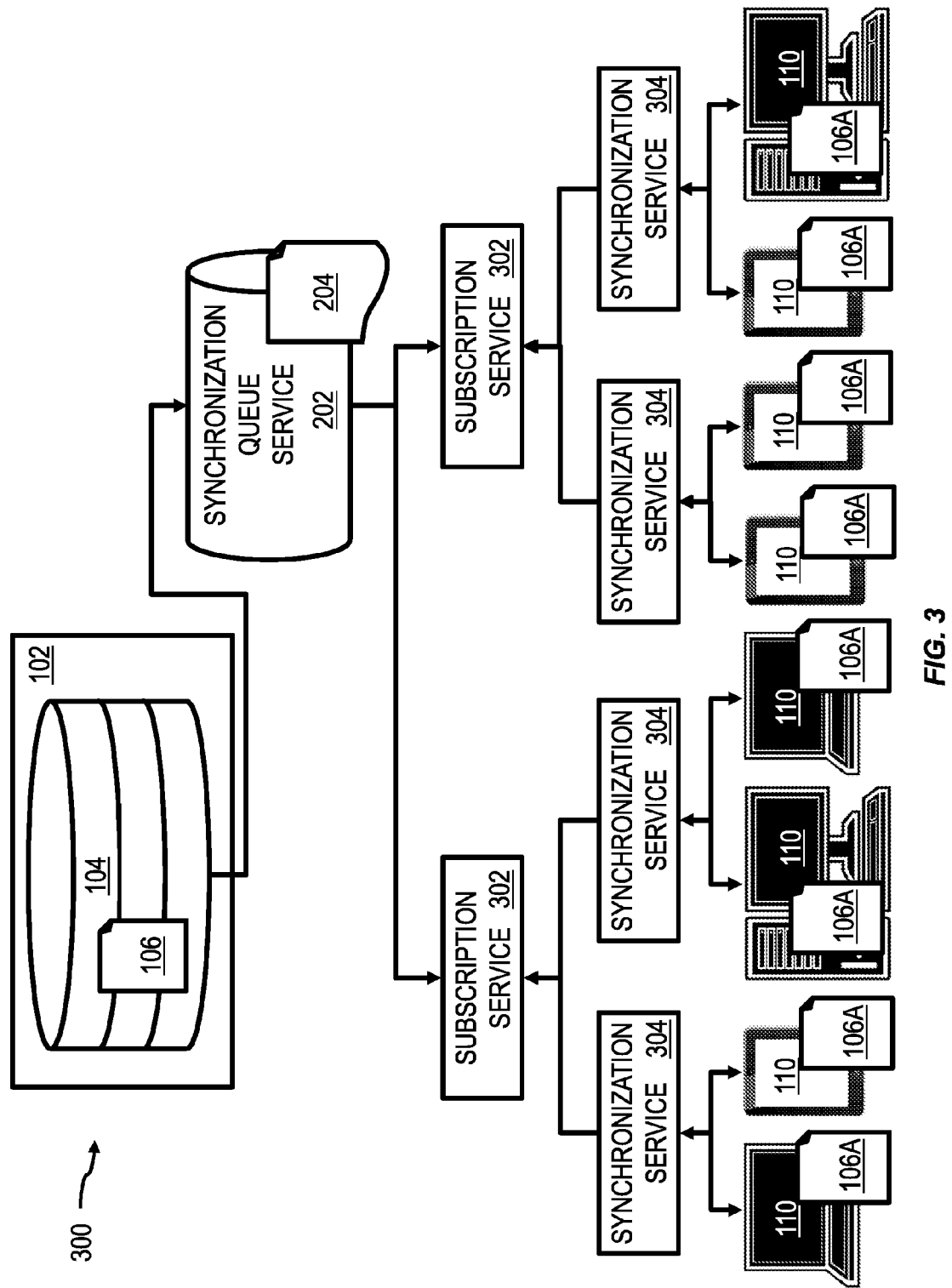
FIG. 3 shows a diagram illustrating a synchronization queuing service and subscription and synchronization services consistent with implementations of the current subject matter.

In the example shown in FIG. 3, a subscription service 302 can retain information (e.g. in the cache of metadata) about whether the state of the content item 106 in the CMS repository 104 has changed since the client machine 110 last synchronized with the CMS repository 104. When a client machine 110 requests information to make the local copy 106A consistent with the content item 106, the synchronization service 304 determines whether the content item 106 has changed and also knows whether the local copy 106A has changed, for example because the client machine 110 has provided this information. Use of a readily replicable synchronization service can provide advantages in scalability. Each synchronization service 304 can handle a subset of the total number of client machines 110 storing local copies 106A of content items 106 maintained at the CMS repository 104. Accordingly, any given synchronization service 304 need only handle the set of change requests pertaining to content items that have been subscribed to by the client machines in its domain.

In an example in which a user of a client machine 110 has originally "subscribed" to a content item 106, the local copy 106A of the content item is present locally on the client machine 110. If at a later time, the user no longer has access to the content item 106, communication of file events between the CMS repository 104 and the client machine 110 are generally halted. The termination of the user's access to the content item 106 can occur for one of a number of reasons. For example, the user may have originally been granted access to a site within a CMS installation 102 (for example a collaboration site, a shared folder, etc.). When access to the site is revoked, the user is no longer subscribed to the content item. Similarly, if another user with sufficient permissions moves the content item 106 out of the site to another location in the CMS repository 104 to which the user has not been granted access, the user's access to the content item 106 would be terminated. When a termination of access occurs, for example for one of the aforementioned reasons or due to other actions, the metadata relating to that user's client machine-held copy of the any relevant content items can be deleted (or otherwise marked as invalid) from the cache of metadata at the subscription service 302, and furthermore, the client-machine can be instructed to delete the local copy 106A of the content item 106.

In a cloud-based CMS installation, multiple tenants can have access to differing sets of content items in the CMS repository 104. In some implementations of the current subject matter, either or both of a subscription service 302 and a synchronization service 304 can be configured to be tenant specific. Such an arrangement would allow the provider of the CMS repository 104 to optimize the quality of service to a particular tenant, as well as assure better security.

As noted above, a change to a content item can also be referred to as a file event. The CMS repository 104 reports or otherwise queues changes at the synchronization queuing service 202. In some implementations of the current subject matter, a content item can be recognized as having changed if its file size has changed, if its checksum has changed, and/or if one or more other criteria indicative of a change in state of the content item, its metadata, its directory structure, or the like are detected. A synchronization service 304 such as those illustrated in FIG. 3, can be responsible for determining whether a local copy 106A stored at a client machine 110 managed by the synchronization service 304 differs from the content item 106 itself at the CMS repository 104. In other words, the synchronization service 304 needs to know whether a file event has affected a content item 106 at the CMS repository 104 for which a managed client machine stores a local copy 106A. In one example, the synchronization service 304 can run a simple comparison between a hash value of the local copy 106A on a client machine (which can be part of the metadata stored by the synchronization service 304) and a hash value of the corresponding content item 106 (which can be part of the metadata stored by the subscription service 302). If the hashes agree, the synchronization service 304 can determine that no relevant file event has occurred for that content item relative to the current version of the local copy 106A at that client machine 110, and the client machine 110 therefore does not need to contact the CMS repository 104 to request a detail of the file event to bring the local copy into synchronization with the content item 106. Other optimizations are possible. For example, if the hashes agree, but some other metadata about the content item 106 has changed, the client machine 110 can optionally download the changed metadata about the content item 106 rather than an entire new copy of the content item 106. This approach can be helpful in improving performance, in particular if the changed metadata are significantly smaller than the entire content item 106.

The synchronization service 304 can also inform the client machine 110 about differences between the local copy 106A stored at the client machine 110 and the version of the content item 106 at the CMS repository 104. In this case, the "current version" of the content item 106 at the CMS repository 104 is more accurately the most recent version of the content item 106 that the synchronization service 304 is aware of. If a file event occurs to the content item 106 (e.g. by some other client machine that is also subscribed to the content item 106 conveying a change to the content item 106) after a most recent check by the synchronization service 304, the synchronization service 304 would not be aware of that file event until its next check with the subscription service 302.

In the event that an apparent conflict exists between the content item 106 and the local copy 106A (e.g. because both have changed since a last synchronization), the client machine 110 can decide whether the apparent conflict is an actual conflict. If an actual conflict exists, in some implementations of the current subject matter one or more conflict resolution techniques can be applied at the client machine to determine how to handle the conflict. For example, conflict resolution techniques can use a state of either of the content item 106 at the CMS repository 104 or the first local copy 106A at the client machine 110 as the determiner in the event of a conflict, retain both versions for manual resolution by the user, etc.). Conflict resolution techniques can make use of one or more factors, which can include time stamps, version numbers, authors, or the like of the respective changes. It can also be useful in resolution of conflicts to be able to determine whether a change reported to a client machine 110 is a consequence of a change that the client itself initiated. For example, an apparent conflict could result from an echo of a create, read, update, or delete operation that started on that client machine. In some implementations of the current subject matter, different instances of a synchronization service 304 can employ different techniques for resolving conflicts based upon customer policy. For example, one policy choice could be a "CMS wins" policy that informs the client machine 110 to ignore any client side changes that were in conflict with the current state of the CMS.

Figure 4:
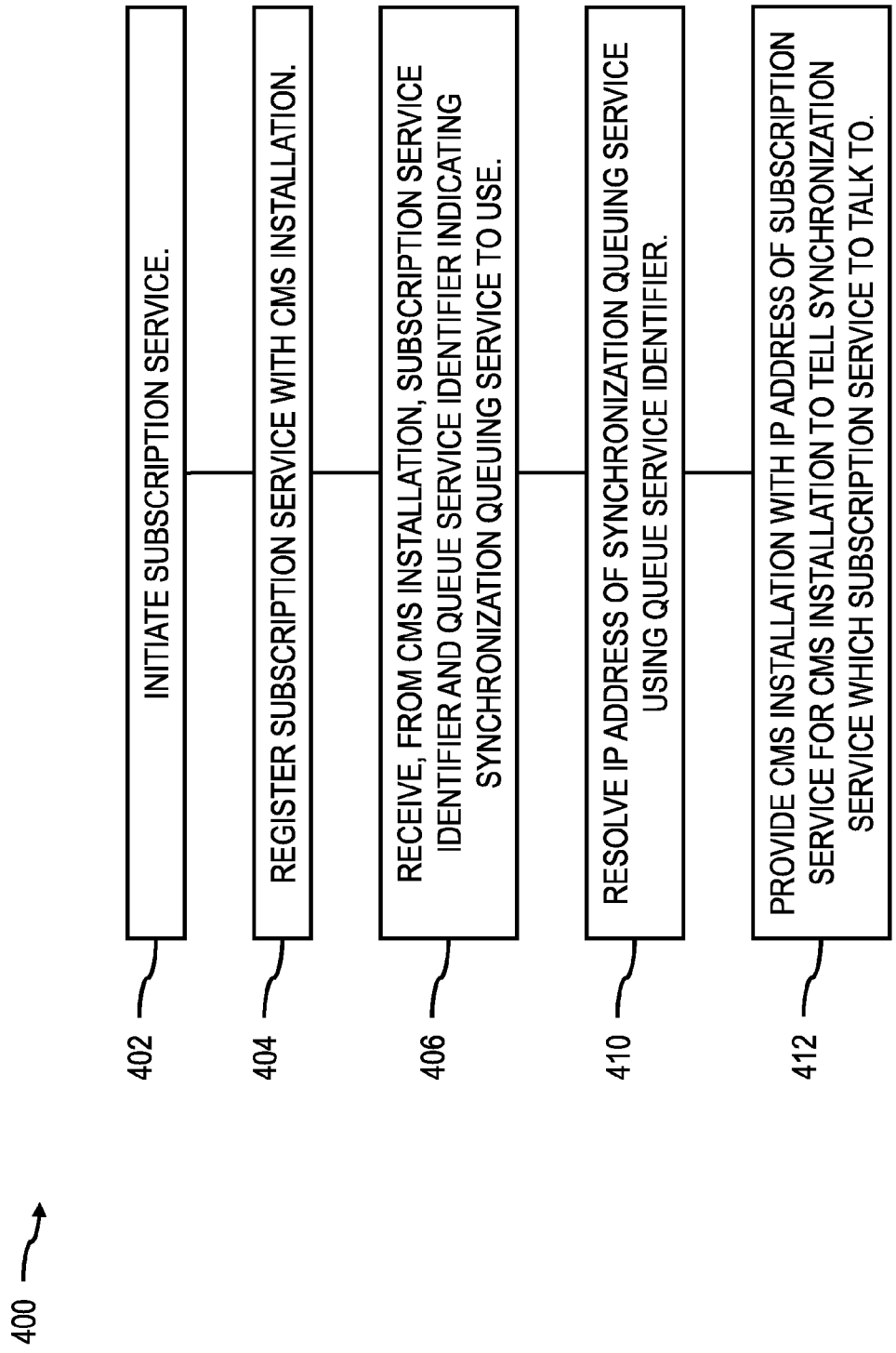
FIG. 4 shows a process flow diagram illustrating operations performed for a subscription service consistent with implementations of the current subject matter.

An operation flow for a subscription service 302 consistent with implementations of the current subject matter can include the operations illustrated in the process flow chart 400 of FIG. 4. At 402, the subscription service 302 is initiated. If this is the first time the subscription service 302 has started, the subscription service 302 can at 404 call an application programming interface (API), which can optionally be a representational state transfer (REST) service provided by the CMS installation 102, to register the subscription service 302. At 406, the CMS installation 102 assigns a subscription service identifier to the subscription service 302 and responds to the request with this subscription service identifier and a queue service identifier indicating a synchronization queuing service 202 that the subscription service 302 should use. At 410, the subscription service 302 calls an API provided by the CMS installation 102 to resolve the IP address of the associated synchronization queuing service 202 using the queue service identifier. The subscription service 302 calls an API provided by the CMS installation 102 at 412 to tell the CMS installation 102 the IP address of the subscription service 302, which the CMS installation 102 needs so that the CMS repository 104 can tell one or more synchronization services 304 which subscription service 302 the synchronization services 304 should talk to.

Figure 5:
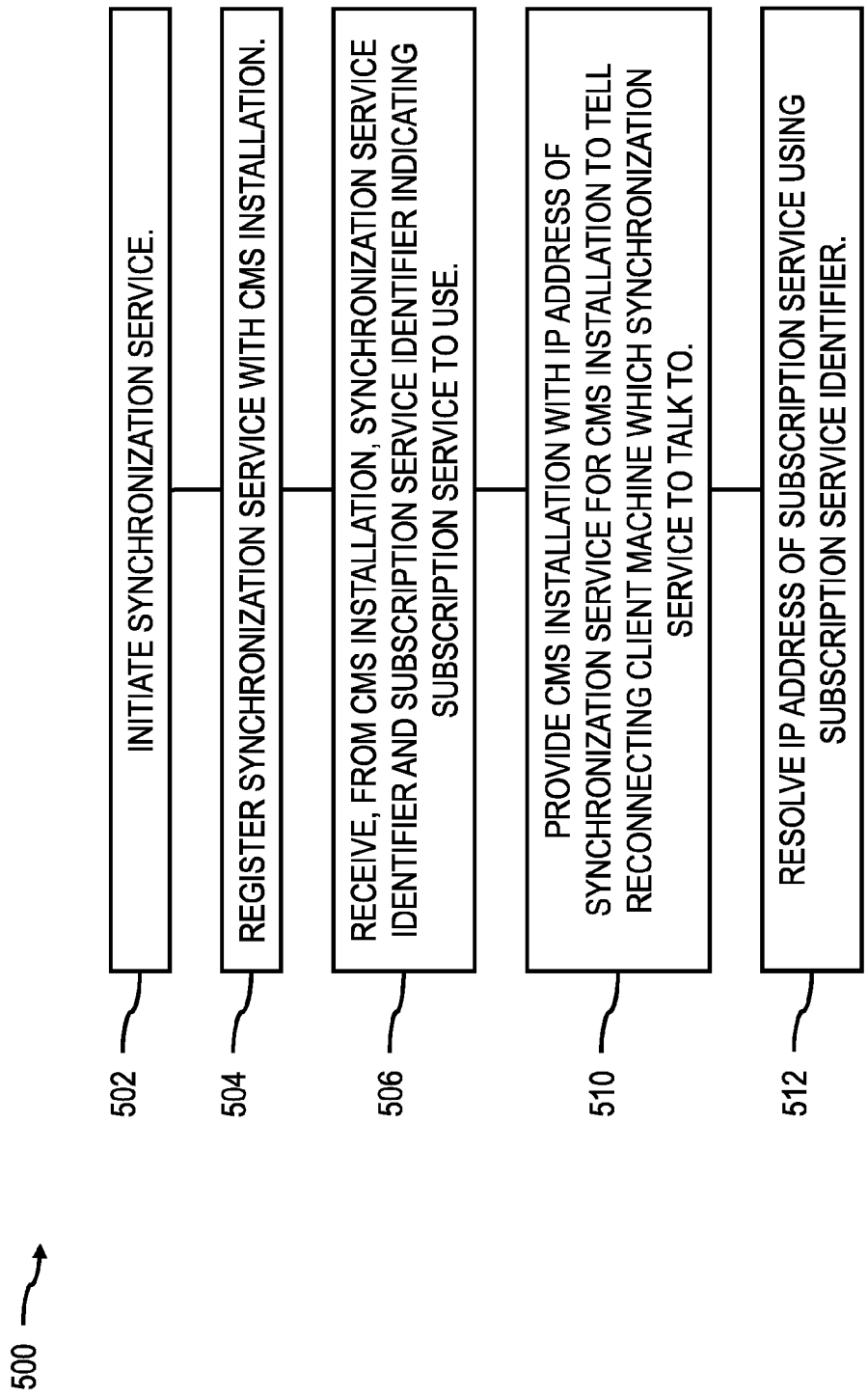
FIG. 5 shows a process flow diagram illustrating operations performed for a synchronization service consistent with implementations of the current subject matter.

An operation flow for a synchronization service 304 consistent with implementations of the current subject matter can include the operations illustrated in the process flow chart 500 of FIG. 5. At 502, the synchronization service 304 is initiated. If this is the first time the synchronization service 304 has started, at 504 the synchronization service 304 calls an API provided by the CMS installation 102 to register itself. At 506, the CMS installation 102 assigns a synchronization service identifier to the synchronization service 304 and responds to the request with this synchronization service identifier and the subscription service identifier of a subscription service 302 to which the synchronization service 304 should talk. At 510, the synchronization service 304 calls an API provided by the CMS installation 102 to tell the CMS installation 102 the IP address of the synchronization service 304, which the CMS installation 102 needs to be able to tell a subscriber client machine 110 what synchronization service 304 the client machine 110 should talk to. At 512, the synchronization service 304 calls an API provided by the CMS installation 102 to resolve the IP address of the associated subscription service 302 using the subscription service identifier.

Figure 6:
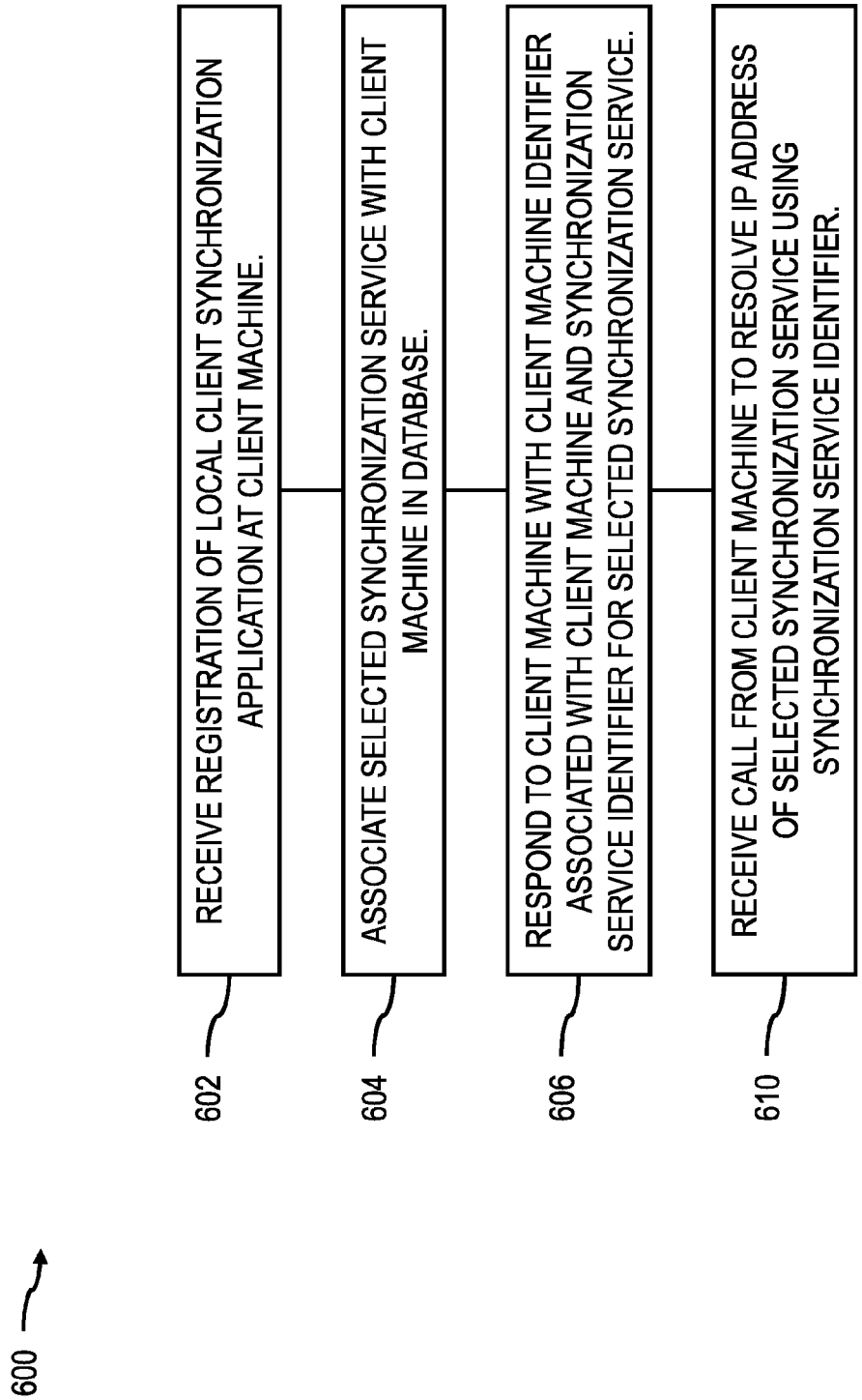
FIG. 6 shows a process flow diagram illustrating operations performed for a client machine consistent with implementations of the current subject matter.

An operation flow for a client machine 110 (e.g. as can be executed by a local client synchronization application) consistent with implementations of the current subject matter can include the operations illustrated in the process flow chart 600 of FIG. 6. At 602, a local client synchronization application at the client machine 110 calls an API provided by the CMS installation 102 to register the local client synchronization application. At 604, the CMS installation 102 selects a synchronization service 304 and associates the selected synchronization service 304 with the client machine 110 (or alternatively with a user using the client machine 110) in a database. At 606, the CMS installation 102 responds to the client machine with a client machine identifier associated with the client machine 110 as well as a synchronization service identifier associated with the selected synchronization service 304. At 610, the client machine 110 resolves the IP address of the selected synchronization service 304 using the synchronization service identifier by making an API request to the CMS installation 102.

Figure 7:
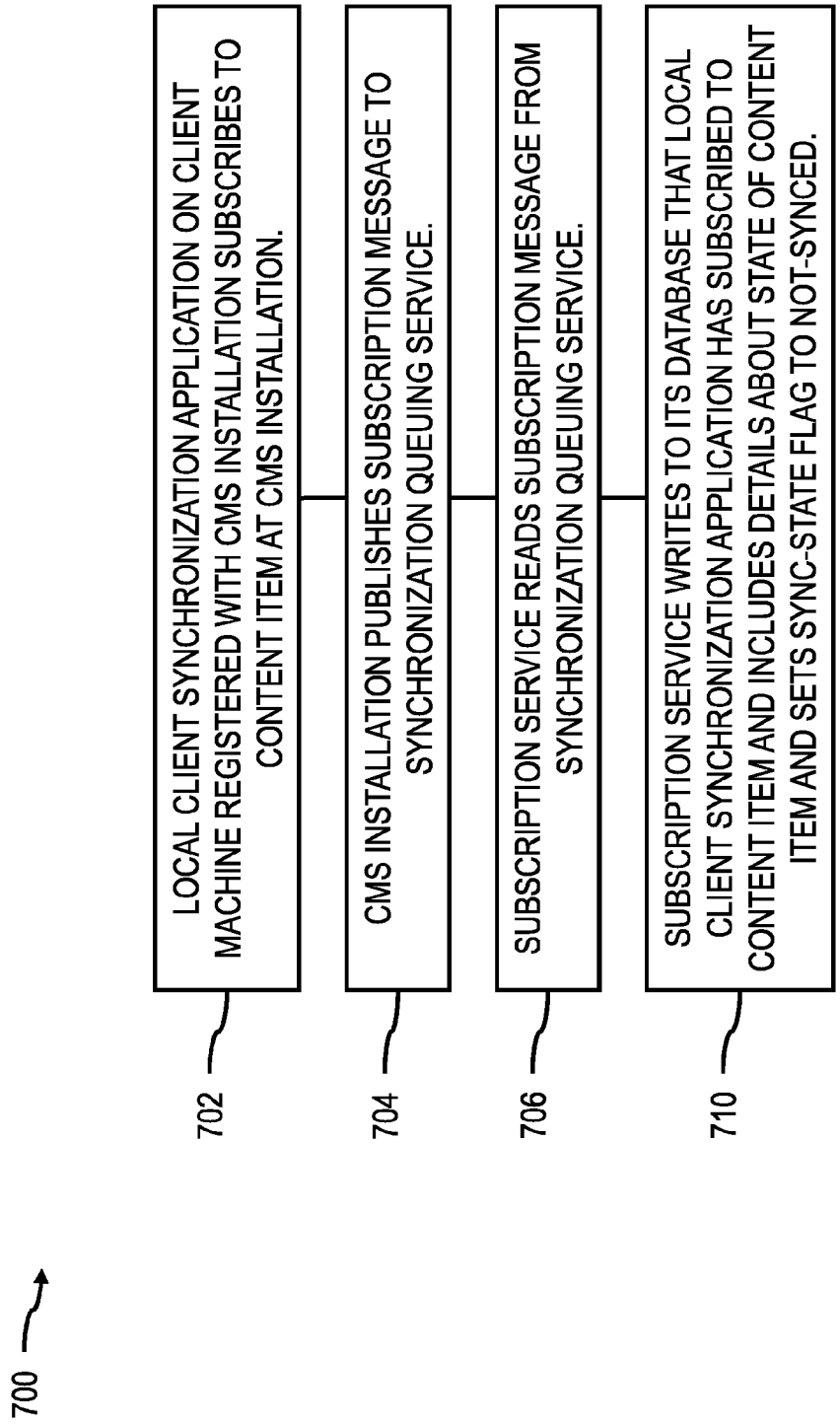
FIG. 7 shows a process flow diagram illustrating operations performed for a content item subscription consistent with implementations of the current subject matter.

An operation flow for a content item subscription process consistent with implementations of the current subject matter can include the operations illustrated in the process flow chart 700 of FIG. 7. At 702, a local client synchronization application on a client machine 110 that is registered with a CMS installation 102 can subscribe to a content item 106, for example using an API provided by the CMS installation 102. At 704, the CMS installation 102 publishes a subscription message to the synchronization queuing service 202 for reading by a subscription service 302 at 706. At 710, the subscription service 302 writes to its database that the local client synchronization application on the client machine 110 (and optionally a specific user of the local client synchronization application) has subscribed to the content item 106 and also writes to its database details about the state of the content item 106 (e.g. a checksum, a size, other identifying details, etc.) and sets a sync-state flag to NOT SYNCED. Over time, the subscription service 302 can build up a database that contains information about every content item in the CMS repository 104 that some client machine has subscribed to. The subscription message can remain on the synchronization queuing service 202 until it ages out (e.g. after some predetermined amount of time, such as for example after 24 hours). In this manner, the subscription message remains available for other of what can optionally be multiple subscription services 302 reading the synchronization queuing service 202.

The following example is described to illustrate processing of content item file events. In this example, a CMS repository includes first, second, third, and fourth content items (F1, F2, F3, and F4). A user on a second client machine 120 modifies the fourth content item (F4) and removes permissions for a user on a first client machine 110 to see the second content item (F2). The CMS repository 104 publishes a content change message to the synchronization queuing service 202, and a subscription service 302 reads the content change message. The subscription service 302 writes the details of the changes (resource id, checksum etc.) for F2 and F4 into its database and sets the sync-state for each file, for each client machine that subscribes to the files. The first client machine 110, which is subscribed to all four content items (F1, F2, F3, and F4), has been offline for some period of time. During that time the local copy of the third content item (F3) at the first client machine 110 was modified and the local copy of the first content item (F1) was deleted. At some interval, the first client machine 110 wakes up (e.g. reconnects to the network) and makes a get changes service request to the synchronization service 304, which includes passing a list of subscribed resources the client machine has changed since it last synchronized to the synchronization service 304. In this case, the list that the client sends to the synchronization service 304 includes the first and third content items (F1 and F3).

The synchronization service 304 can send a "get changes" service request to the subscription service 302, which can reply with identifiers for any resources that have changed for the first client machine 110 and the first user since the first client machine 110 was last synchronized. The synchronization service 304 analyzes the changes that it received from the subscription service 302 (F2 and F4) and the changes it received from the first client machine 110 (F1 and F3). The subscription service 302 sees that the first user no longer has access to the second content item F2 (because the subscription service 302 previously processed a permission changed message) and knows that the fourth content item (F4) has changed in the CMS repository (e.g. because the subscription service 302 previously processed a content changed message). The synchronization service 304 does a comparison of the set of changes and knows that the state of the second and fourth content items (F2 and F4) at the CMS repository is more current that the state of those resources at the first client machine 110 for the first user. The synchronization service 304 also sees that the state of the first and third content items (F1 and F3) on the first client machine 110 is more current than the state of those resources on the CMS repository 104. As a result the synchronization service 304 responds to the first client machine 110 to inform the first client machine 110 that it should (a) request the fourth content item (F4) from the CMS repository 104, (b) no longer see the second content item (F2), (c) request the CMS Repository 104 to delete the first content item (F1), and (d) upload its newer version of the third content item (F3). While this example includes numerous activities that can be interpreted as changes to content items, this example is not meant to be limiting. For example, a permission-changed message as discussed above is not required in any implementation of the current subject matter.

Figure 8:
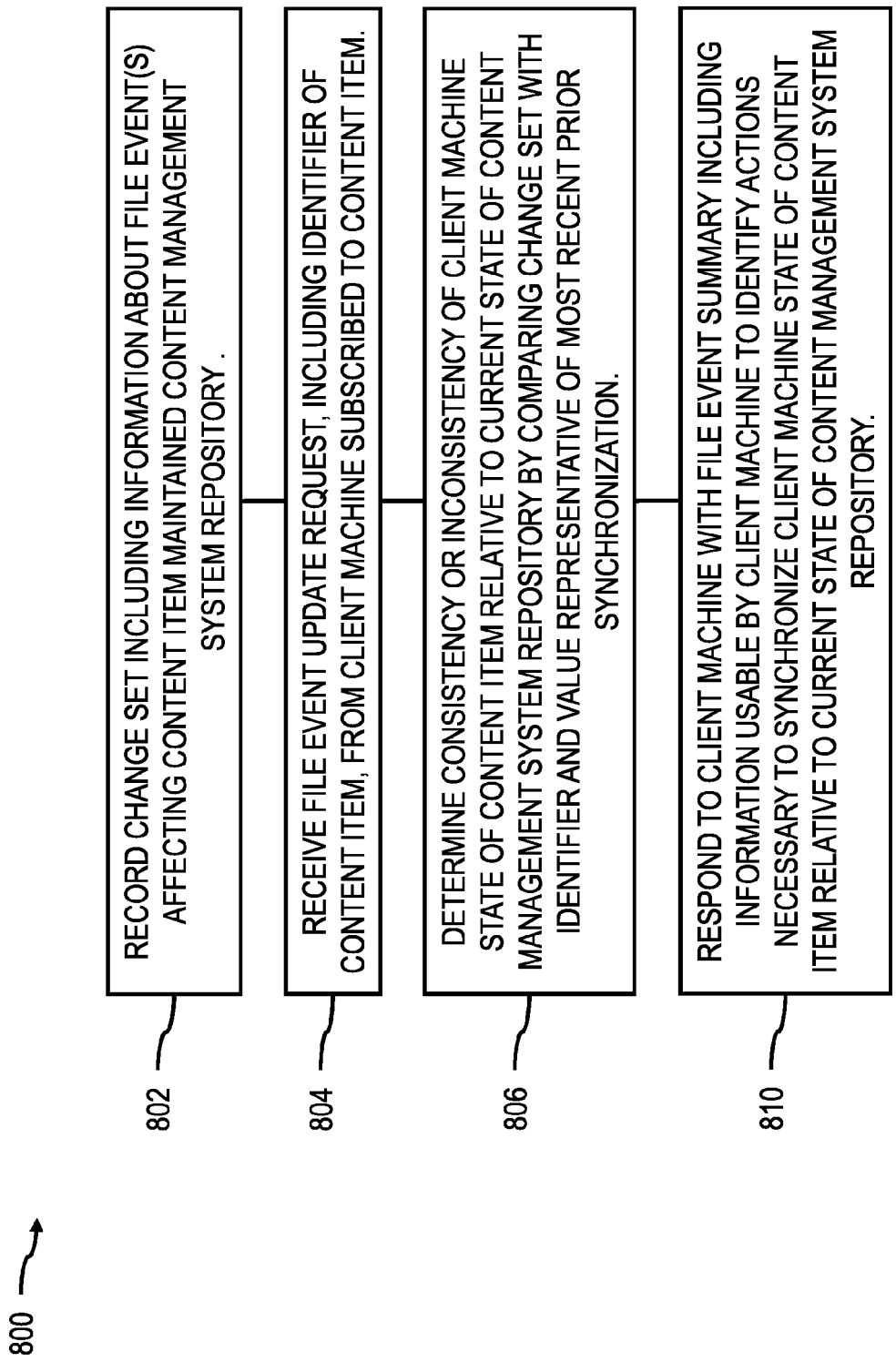
FIG. 8 shows a process flow diagram illustrating aspects of a method having one or more features consistent with implementations of the current subject matter.

The process flow chart 800 of FIG. 8 illustrates features of a method consistent with implementations of the current subject matter. At 802, a synchronization queuing service associated with a content management system repository records a change set that includes information about one or more file events affecting a content item maintained by the content management system repository. The file event can include one or more actions, events, changes, etc. as discussed above. The recording can occur in a data structure (e.g. a queue, a log, a database, etc.) at the synchronization queuing service, which can be implemented on a separate processing system than the CMS repository.

At 804, the synchronization queuing service receives a file synchronization request, which can be sent from a client machine subscribed to the content item. The file synchronization request includes an identifier of the content item and can optionally include a request for synchronization information for any changes having occurred to the content item since a most recent prior synchronization between the client machine and the content management system repository. As noted above, a client machine subscribed to a content item at the content management system repository can store a local copy of the content item or optionally does not store a local copy but has access to receive a synchronized version of the content item.

At 806, the synchronization queuing service determines consistency or inconsistency of a client machine state of the content item relative to a current state of the content management system repository. The determining includes comparing the change set with the identifier and a value representative of a most recent prior synchronization between the client machine and the CMS repository. The synchronization queuing service can retain information about the most recent prior synchronization for the client machine and for one or more other client machines. The value representative of the most recent prior synchronization between the client machine and the synchronization queuing service can include a time stamp, a versioning number or hash, a checksum, or the like.

At 810, the synchronization queuing service responds (e.g. to the client machine) with a file event summary that includes information usable by the client machine to identify actions necessary to synchronize the client machine state of the content item relative to the current state of the content management system repository. In other words, the synchronization queuing service sends the file event summary to the client machine. In some examples, the file event summary includes an indication that the content item has undergone a file event since the most recent updating of the local copy at the client machine. The file event summary allows the client machine to contact the CMS repository to request a file event detail response for the content item. In other examples, the file event summary can include information relating to synchronizing or not synchronizing changes made at the client machine relative to a current state of the CMS repository. The information usable by the client machine can, in some examples, include no requirement for the client machine to directly contact the content management system repository. For example, the client machine need not directly contact the CMS repository when no actions are necessary to synchronize the client machine state of the content item relative to the current state of the content management system repository.

In some further implementations of the current subject matter, a client machine can dynamically discover an instance of the synchronization queuing service to which it can make synchronization requests. This capability can allow the assignment of a synchronization queuing service to be optimized based on one or more of geography, bandwidth, or security factors.

In other variations, the content management system can dynamically discontinue the ability of a client machine to make synchronization requests.

A client machine that has not changed any content items that it has previously synchronized with the synchronization queuing service, and in which no content items that the client machine has subscribed to have changed in the content management system, need not contact the content management system except possibly for authentication. In such a case, the client machine presents no load on the content management system to know that it is fully synchronized.

Content retained (e.g. as a local copy or as cached content) on a client machine can be revoked in cases where the CMS repository has determined that the user on the client machine should no longer have access to the content. This revoking of content can optionally include removing permissions for the client machine to receive further synchronization information from the synchronization queuing service 202 and the CMS repository 104. In some examples, the synchronization queuing service 202 can transmit a command to a local client synchronization application at the client machine 110 to cause any locally stored content (e.g. cached content items, local copies 106A of content items, etc.) to be deleted from the storage at the client machine. Such approaches can be useful in maintaining content item security, for example in the case of a reported or detected theft of a client machine that is subscribed to one or more content items at the CMS repository 104.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a machine-readable medium storing instructions that, when executed by at least one programmable processor, cause the at least one programmable processor to implement a synchronization queuing service configured to perform operations comprising:

recording, to a data structure maintained by the synchronization queuing service, a change set comprising information about one or more file events affecting a content item maintained by a content management system repository with which the synchronization queuing service is associated;

receiving, at the synchronization queuing service from a client machine subscribed to the content item, a file synchronization request comprising an identifier of the content item, and a list that includes a change made at the client machine to affect the client machine state of the content item;

determining consistency or inconsistency, relative to a current state of the content management system repository, of a client machine state of the content item at the client machine, the determining comprising comparing the change set with the identifier and a value representative of a most recent prior synchronization between the client machine and the synchronization queuing service; and responding with a file event summary, the file event summary comprising information usable by the client machine to identify actions necessary to synchronize the client machine state of the content item relative to the current state of the content management system repository when the client machine state of the content item is inconsistent with the current state of the content management system repository or with an indication the client machine need not directly contact the content management system repository when the client machine state of the content item is consistent with the current state of the content management system repository, the information usable by the client machine comprising directions for the client machine to directly contact the content management system repository to make the client machine state of the content item consistent with the current state of the content management system repository.

2. A computer program product as in claim 1, wherein the file synchronization request further comprises a list that includes a change made at the client machine to affect the client machine state of the content item.

3. A computer program product as in claim 2, wherein the operations further comprise: subscribing the client machine to the content item, the subscribing allowing the client machine to request that the synchronization service compare the change made at the client machine to the current state of the content management system.

4. A computer program product as in claim 2, wherein the information usable by the client machine to identify actions necessary to synchronize the client machine state of the content item relative to the current state of the content management system repository comprises an indication that the change made at the client machine is in conflict with the current state of the content management system repository.

5. A computer program product as in claim 2, wherein the information usable by the client machine to identify actions necessary to synchronize the client machine state of the content item relative to the current state of the content management system repository comprises an indication that the change made at the client machine is not in conflict with the current state of the content management system repository such that the current state of the content management system repository can be safely updated to reflect the change made at the client machine.

6. A computer program product as in claim 2, wherein the information usable by the client machine to identify actions necessary to synchronize the client machine state of the content item relative to the current state of the content management system repository comprises an indication that the change made at the client machine is no longer relevant to the current state of the content management system repository such the client machine can safely ignore the change made at the client machine.

7. A computer program product as in claim 1, wherein the recording further comprises receiving, by the synchronization queuing service, a message from at least one of the content management system repository, the client machine, and another client machine, the message comprising a description of a file event of the one or more file events; and adding the file event to the data structure.

8. A computer program product as in claim 1, wherein the file event comprises at least one of a change to the content item in the content management system repository, a change to a local copy of the content item that is stored on the client machine, and a change to a directory structure containing the content time at the content management system repository.

9. A computer program product as in claim 1, wherein the operations further comprise: receiving, by the synchronization queuing service, an update message from the content management system repository, the update message providing the change set comprising a file event of the one or more file events.

10. A computer program product as in claim 9, wherein the update message is published by the content management system repository as part of a content management system transaction for an operation relating to the file event, and wherein failure of the synchronization queuing service to receive the update message causes the content management system repository to roll back the operation.

11. A computer program product as in claim 1, wherein the content management system repository is implemented on one or more machines separate from the at least one programmable processor implementing the synchronization queuing service.

12. A computer program product as in claim 1, wherein the data structure maintained by the synchronization queuing service comprises a database of file events occurring for content items maintained at the content management system repository, and the recording comprises at least one of creating, updating, and deleting an entry in the database.

13. A computer program product as in claim 1, wherein the operations further comprise: creating, by the synchronization queuing service, the file event summary using stored information associating the client machine identifier received in the file synchronization request with the content item to which the client machine is subscribed.

14. A computer program product as in claim 1, wherein the client machine stores a local copy of the content item to which it is subscribed.

15. A computer program product as in claim 1, wherein the file synchronization request further comprises a request for synchronization information for any changes having occurred to the content item since the most recent prior synchronization between the client machine and the synchronization queuing service.

16. A computer program product as in claim 1, wherein the file synchronization request is received from the client machine.

17. A computer program product as in claim 1, wherein the synchronization queuing service comprises a multi-part service arrangement implemented on a plurality of machines, the multi-part service arrangement comprising:
 a subscription service, the subscription service reading the change set from the data structure and storing the change set locally, the subscription service comprising a cache of metadata associated with a plurality of content items to which any of a plurality of managed client machines has subscribed; and
 a synchronization service, the synchronization service managing a subset of the plurality of managed client machines, the subset comprising the client machine, the synchronization service performing operations comprising:
  receiving the file synchronization request from the client machine,
  accessing the change set and cache of metadata stored locally by the subscription service, and
  responding to the client machine with the file event summary.

18. A computer program product as in claim 17, wherein the cache of metadata comprises information about whether a state of the content item in the content management system repository has changed since the client machine last synchronized with the content management system repository.

19. A system comprising computer hardware configured to provide operations of a synchronization queuing service, the operations comprising:
 recording, to a data structure maintained by the synchronization queuing service, a change set comprising information about one or more file events affecting a content item maintained by a content management system repository with which the synchronization queuing service is associated;
 receiving, at the synchronization queuing service from a client machine subscribed to the content item, a file synchronization request comprising an identifier of the content item, and a list that includes a change made at the client machine to affect the client machine state of the content item;
 determining consistency or inconsistency, relative to a current state of the content management system repository, of a client machine state of the content item at the client machine, the determining comprising comparing the change set with the identifier and a value representative of a most recent prior synchronization between the client machine and the synchronization queuing service; and
 responding with a file event summary, the file event summary comprising information usable by the client machine to identify actions necessary to synchronize the client machine state of the content item relative to the current state of the content management system repository when the client machine state of the content item is inconsistent with the current state of the content management system repository or with an indication the client machine need not directly contact the content management system repository when the client machine state of the content item is consistent with the current state of the content management system repository, the information usable by the client machine comprising directions for the client machine to directly contact the content management system repository to make the client machine state of the content item consistent with the current state of the content management system repository.

20. A system as in claim 19, wherein the computer hardware comprises a programmable processor receiving instructions that cause the programmable processor to perform at least some of the operations.

21. A computer-implemented method for implementing a synchronization queuing service, the method comprising:
 recording, to a data structure maintained by the synchronization queuing service, a change set comprising information about one or more file events affecting a content item maintained by a content management system repository with which the synchronization queuing service is associated;

receiving, at the synchronization queuing service from a client machine subscribed to the content item, a file synchronization request comprising an identifier of the content item, and a list that includes a change made at the client machine to affect the client machine state of the content item;

determining consistency or inconsistency, relative to a current state of the content management system repository, of a client machine state of the content item at the client machine, the determining comprising comparing the change set with the identifier and a value representative of a most recent prior synchronization between the client machine and the synchronization queuing service; and responding with a file event summary, the file event summary comprising information usable by the client machine to identify actions necessary to synchronize the client machine state of the content item relative to the current state of the content management system repository when the client machine state of the content item is inconsistent with the current state of the content management system repository or with an indication the client machine need not directly contact the content management system repository when the client machine state of the content item is consistent with the current state of the content management system repository, the information usable by the client machine comprising directions for the client machine to directly contact the content management system repository to make the client machine state of the content item consistent with the current state of the content management system repository.

* * * * *